United States Patent [19]
Brox et al.

[11] Patent Number: 5,529,767
[45] Date of Patent: Jun. 25, 1996

[54] PRINTED SHAPED BODIES AND SHEETS CONTAINING GELATIN

[75] Inventors: Werner Brox, Beerfelden; Peter Block, Eberbach; Reiner Schäfer, Heiligkreuzsteinach, all of Germany

[73] Assignee: R. P. Scherer Corporation, Troy, Mich.

[21] Appl. No.: 462,801

[22] Filed: Jun. 5, 1995

Related U.S. Application Data

[63] Continuation of Ser. No. 86,615, Jul. 1, 1993, abandoned.

[30] Foreign Application Priority Data

Jul. 3, 1992 [DE] Germany ........................ 42 21 868.3

[51] Int. Cl.[6] ...................................... A61K 9/64
[52] U.S. Cl. .................. 424/10.2; 424/455; 424/456; 424/467; 428/206; 428/207; 428/409
[58] Field of Search ............................ 428/206, 207, 428/211, 331, 409; 424/456, 463, 455, 467, 10.2

[56] References Cited

U.S. PATENT DOCUMENTS 4,446,174  5/1984  Maekawa et al. ..................... 428/207

FOREIGN PATENT DOCUMENTS

0254988A3  7/1987  European Pat. Off. .
3818071C1  3/1989  Germany .
1467548    3/1977  United Kingdom .

*Primary Examiner*—Pamela R. Schwartz
*Attorney, Agent, or Firm*—Banner & Allegretti, Ltd.

[57] ABSTRACT

This invention is comprised of printed shaped bodies and sheets comprising gelatin or having at least an outer surface comprised of at least 5% gelatin or chemically modified gelatin, the shaped bodies and sheets being printed with ink by an ink jet. In particular, the ink applied to the shaped bodies and sheets by the ink jet contains an aluminum and/or calcium compound in addition to dyes and/or pigments, or an aluminum and/or calcium dye compound, and optionally non-volatile proportions of solubilizers and/or dispersants. Further, where the ink contains an aluminum compound, the ink is preferably adjusted to alkaline condition. The invention allows shaped bodies or sheets of gelatin to be printed with ink that is unlikely to be transferred in the form of "ghost images" to adjacent shaped bodies or sheets.

14 Claims, No Drawings

5,529,767

PRINTED SHAPED BODIES AND SHEETS CONTAINING GELATIN

This application is a continuation of application Ser. No. 08/086,615, filed Jul. 1, 1993; now abandoned.

REFERENCE TO RELATED APPLICATIONS

This application claims foreign priority benefits under 35 U.S.C. § 119 based upon the copending German patent application Serial No. P 42 21 868.3, filed on Jul. 3, 1992.

BACKGROUND AND SUMMARY OF THE INVENTION

The present invention relates to shaped bodies and sheets comprised of gelatin or of which the outer layer is comprised of at least 5% gelatin or chemically modified gelatin. More particularly, the present invention relates to hard and soft gelatin capsules and sheet gelatin, which has been printed by using the ink jet process, and to processes for printing these shaped bodies and sheets. Still more particularly, the present invention relates to the inks used in the process of imprinting these shaped bodies and sheets.

Shaped bodies comprised of gelatin or having outer layers comprised of gelatin often need to be printed with an identifying logo, code or other mark. For instance, such a mark might identify the manufacturer or a brand name, or it might provide other useful information. Existing printing methods include embossed printing, gravure printing, screen printing, laser printing and, more particularly and frequently in the case of gelatin capsules, ink jet printing. The increasing frequency of the use of ink jet printing on gelatin capsules is due to the fact that printing techniques other than ink jet printing require the application of a mechanical and/or thermal load which may damage the capsules. A further drawback of existing printing methods is the undesirable occurrence of staining spots and streaks that may be caused upon contact with the freshly printed capsules after they leave the printing station. The ink jet printing process is especially preferred for gelatin capsules because it enables printing without contact and thus avoids damage to the product. Specifically, printing rollers and rubber rolls are no longer required. Further, the ink jet process allows rounded articles such as, for example, gelatin capsules filled with bathing oils, to be provided with larger imprints, even though the surfaces of the articles are greatly curved.

The inks that have been used for ink jet printing of hard and soft gelatin capsules consist predominantly of water. Further, they contain additional solvents such as, for example, ethanol, isopropanol and propylene glycol and viscosity-increasing polymers such as, for example, cellulose derivatives. In addition, the colorants most frequently used are readily water-soluble organic dyes.

As disclosed by Derwent's abridged edition 86-090677/14 of JP 61-035-989-A, an ink jet process is known, wherein the ink-bearing material such as gelatin, casein, starch, gum arabic, sodium alginate, poly(acrylic amide), PVP, poylurethane, CMC, or polyester is coated with an ink-permeable layer of a somewhat less hydrophilic material such as poly(vinyl acetate), polyethylene or PVC. However, this process is completely unsuitable for printing gelatin capsules.

Further, as disclosed by DE-A-34 11 136, there exist thixotropic gravure printing inks having a resinous binder, pigment and a solvent system, wherein flowability is modified, for example, by aluminum salts of alkane carboxylic acids, most frequently in admixture with fatty acids and other ingredients. However, such inks are completely unsuitable for the ink jet process.

As suggested above, it has been discovered that one drawback inherent in the ink jet process is the fact that gelatin capsules, especially those having a capsule filling containing liquid hydrophilic components such as water, ethanol, propylene eglycol or poly(ethylene glycols), when stored adjacent to other capsules, may tend to transfer some ink jet ink to adjacent capsules. As an unfortunate result, so-called "ghost images" or staining spots and mirror-image portions of the typeface or design may appear on the adjacent capsules. Similar phenomena are also observed with gelatin sheets such as "sheet gelatin" which is used as a food product. Since printed sheets of gelatin are often closely stacked together in a package, the occurrence of "ghost images" is likely.

It is therefore an object of the present invention to provide a printed shaped body or sheet of gelatin without the above-discussed disadvantages.

It is a further object of the present invention to provide an improved ink jet printing process for printing shaped bodies or sheets, whereby the above-discussed disadvantages will be eliminated.

More particularly, it is an object of the present invention to provide a printed shaped gelatin body or sheet and an improved ink jet printing process for printing shaped gelatin bodies or sheets, whereby the ink deposited by the ink jet process remains durably and firmly adhered to those locations where it has been deposited, so that it cannot be inadvertently transferred to the adjacent surfaces of other shaped bodies or sheets.

DETAILED DESCRIPTION OF THE PERFERRED EMBODIMENT

It has been discovered that the above-stated objects may be well and easily attained if the inks used in the ink jet process contain an aluminum compound and/or a calcium compound. Preferably, the inks contain an aluminum compound. Most preferably, the inks contain an alkali metal aluminate as the aluminum compound. For instance, particularly good results are achieved with the dyes Carminic Acid (E 120), Brilliant Blue (E 133), Allura Red (E 129) and mixtures thereof. However, in principle, any other dye permitted by legal regulations may be used if it is capable of reacting with aluminum ions and calcium ions to form aluminum salts and calcium salts or the so-called aluminum lakes and calcium lakes, which stand out to an optically sufficient degree against the printed shaped articles, and especially against the capsules. Thus, other examples may include Tartrazine (E 102), Quinoline Yellow (E 104), Sunset Yellow S (E 110), Fast Red C (E 122), Amaranth (E 123), Cochineal Red (E 124), Erythrosine (E 127) and Indigotin (E 132). Still other dyes may be taken into consideration in view of various legal provisions, for printing shaped articles to be used for cosmetic purposes. Further, while some of the above-mentioned dyes are especially suitable for shaped articles and gelatin capsules dyed with the contrasting color of said dyes, others are not. Therefore, the ink jet ink may additionally contain colorant pigments such as titanium dioxide, by means of which bright characters or marks may be printed on dark-colored capsules.

It has been shown that especially soft gelatin capsules which contain solvents such as water, ethanol, propylene glycol, glycerol, and poly(ethylene glycols) tend to subsequently transfer part of the ink printed thereon to other capsules. This problem is reduced or eliminated if, according to the present invention, the ink jet uses inks containing an aluminum compound and/or a calcium compound. The aluminum compound preferably is an alkali metal aluminate, among which sodium aluminate and potassium aluminate are considered in principle.

For instance, the above-mentioned dyes Carminic Acid (E 120), Brilliant Blue (E 133) etc. are commercially available as aluminum lakes. Within the scope of the present invention, it is possible to dissolve these colored lakes in lyes such as in caustic soda solution and caustic potash solution or ammonia, and then to admix the resulting solution with further optionally nonvolatile solvents and/or dispersants. The ink jet inks thus prepared, when printed on hard or soft gelatin capsules or sheet gelatin, do not produce any ghost images. Since the dye contents of the commercially available aluminum lakes generally are not very high, the pure dye is preferred as a starting material for the preparation of the ink jet ink.

The hard and soft gelatin capsules preferably printed according to the ink jet printing method of the present invention should contain from 5% to 100% of gelatin, and preferably from 20% to 100% of gelatin. Further, the ink jet printing method of the present invention may be applied to capsules made with naturally occurring gelatin as well as to capsules made with a chemically modified gelatin such as succinylated gelatin. In fact, modified gelatin may often be desired in order to attain certain properties.

According to the present invention, by using the ink jet printing method, the shaped bodies or sheets to be printed can be printed not only with type characters such as letters and numbers, but also with other useful information such as companies' emblems or decorations.

Preferred shaped articles according to the invention and especially soft gelatin capsules printed by the present ink jet process are illustrated in greater detail in the following examples:

EXAMPLE 1

14.5 g of aluminum chloride hexahydrate is dissolved in 250 g of water, and 29 g of a 25% aqueous sodium hydroxide solution is added thereto. The pH value of the solution is about 8. The precipitate of aluminum hydroxide is centrifuged off, washed with water and then re-dissolved with 2% aqueous sodium hydroxide solution. 25 g of Carminic Acid (E 120) is added to the freshly prepared stirred sodium aluminate solution and dissolved therein. After filtration, the pH value is adjusted to about 10.5 using 25% aqueous sodium hydroxide solution. 11.0 g of hydroxypropylmethylcellulose dissolved in 245 g of water is added to the resulting solution. There is further dropwise added and admixed with stirring 67 g of propylene glycol and 150 g of isopropyl alcohol. Thereby, 1 kg of an ink jet ink is formed which is excellently processable and no longer produces any "ghost images".

EXAMPLE 2

In the same manner as described in Example 1, an ink is prepared using Brilliant Blue (E 133). The gelatin capsules and gelatin sheets printed with this ink likewise do not show any disturbing "ghost images".

EXAMPLE 3

33.3 g of Brilliant Blue (E 133) is dissolved in 200 g of water, and the solution is passed through a cation exchanger to prepare the dye acid from the dye disodium salt. Subsequently, the ion exchanger is washed with 340.7 g of water. The pH value of the resulting dye solution is about 1.2. 14.0 g of calcium chloride and 4.0 g of calcium carbonate are dissolved therein, and the pH value will rise to about 6.0. To this solution is added 11.0 g of hydroxypropylmethylcellulose dissolved in 150 g of water. In addition, 67 g of propylene glycol and 180 g of isopropanol are added dropwise and stirred in. In this fashion, 1 kg of ink jet ink is formed which can be processed excellently and which only very occasionally produces faint "ghost images".

COMPARATIVE EXAMPLE

An ink having the same composition and containing Brilliant Blue (E 133) as the dye, but without addition of alkali metal aluminate, likewise provides good printing results; however, "ghost images" are observed to a considerable extent. The same is true for an ink according to Example 3 which, however, contains the disodium salt of the dye acid.

While a preferred embodiment of the present invention has been depicted and described, it will be appreciated by those skilled in the art that many modifications, substitutions and changes may be made thereto without departing from the true spirit and scope of the invention.

What is claimed is:

1. A gelatin capsule bearing a mark on an outer surface, the mark being printed with ink, the ink comprising a dye and an aluminum or calcium compound, the aluminum or calcium compound complexing with the dye to form an aluminum or calcium dye salt.

2. A gelatin capsule as in claim 1, containing a filling comprising a liquid hydrophilic component.

3. A gelatin capsule as in claim 2, wherein the filling contains at least 5% by weight water, ethanol, propylene glycol, glycerol, poly(ethylene glycols) or mixtures thereof.

4. A gelatin capsule comprising at least 20% by weight gelatin and bearing a mark on an outer surface, the mark being printed with ink, the ink comprising a dye and an aluminum or calcium compound, the aluminum or calcium compound complexing with the dye to form an aluminum or calcium dye salt.

5. A gelatin capsule as claimed in claim 4 wherein said gelatin is succinylated gelatin.

6. A gelatin capsule as claimed in claim 4 wherein the mark is printed with ink by an ink jet process.

7. A gelatin capsule as claimed in claim 4 wherein the ink further contains nonvolatile solubilizers or dispersants or both.

8. A gelatin capsule as claimed in claim 4 wherein the ink is an aqueous solution.

9. A gelatin capsule as claimed in claim 4 wherein the ink has a pH value of between about 6 and about 10.5.

10. A gelatin capsule as claimed in claim 4 wherein the aluminum or calcium compound is an alkali metal aluminate.

11. A gelatin capsule as claimed in claim 4, wherein the gelatin capsule contains a filling comprising a liquid hydrophilic component.

12. A gelatin capsule as claimed in claim 11 wherein the filling contains at least 5% by weight water, ethanol, propylene glycol, glycerol, poly(ethylene glycols) or mixtures thereof.

13. A gelatin capsule as claimed in claim 4 wherein the dye compound is selected from the group consisting of Carminic Acid (E 120), Brilliant Blue (E 133), and Allura Red (E 129).

14. A gelatin capsule as claimed in claim 13 wherein the dye compound is Carminic Acid (E 120).

* * * * *